(12) United States Patent
Khoshnevisan et al.

(10) Patent No.: US 11,558,735 B2
(45) Date of Patent: Jan. 17, 2023

(54) CARRIER AGGREGATION CAPABILITY FRAMEWORK

(71) Applicant: QUALCOMM Incorporated, San Diego, CA (US)

(72) Inventors: Mostafa Khoshnevisan, San Diego, CA (US); Seyedkianoush Hosseini, San Diego, CA (US); Xiaoxia Zhang, San Diego, CA (US); Wanshi Chen, San Diego, CA (US); Peter Gaal, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 16/843,003

(22) Filed: Apr. 8, 2020

(65) Prior Publication Data
US 2020/0336892 A1 Oct. 22, 2020

Related U.S. Application Data

(60) Provisional application No. 62/836,572, filed on Apr. 19, 2019.

(51) Int. Cl.
*H04W 8/24* (2009.01)
*H04L 5/00* (2006.01)
*H04W 72/10* (2009.01)
*H04L 1/18* (2006.01)

(52) U.S. Cl.
CPC ............ *H04W 8/24* (2013.01); *H04L 1/1819* (2013.01); *H04L 5/001* (2013.01); *H04W 72/10* (2013.01)

(58) Field of Classification Search
None
See application file for complete search history.

(56) References Cited

U.S. PATENT DOCUMENTS

| 9,794,943 B1* | 10/2017 | Oroskar | H04W 72/1257 |
|---|---|---|---|
| 2012/0314675 A1* | 12/2012 | Vujcic | H04L 5/001 |
| | | | 370/329 |
| 2013/0155868 A1* | 6/2013 | Seo | H03M 13/6525 |
| | | | 370/241 |
| 2014/0370905 A1* | 12/2014 | Kim | H04W 28/04 |
| | | | 455/450 |
| 2017/0238316 A1* | 8/2017 | Li | H04W 72/048 |
| | | | 370/329 |
| 2018/0076872 A1* | 3/2018 | Li | H04L 5/0092 |

(Continued)

OTHER PUBLICATIONS

International Search Report and Written Opinion—PCT/US2020/027507—ISA/EPO—dated Jul. 27, 2020.

(Continued)

*Primary Examiner* — Steve R Young
(74) *Attorney, Agent, or Firm* — Alan Gordon

(57) ABSTRACT

Certain aspects of the present disclosure provide techniques for indicating carrier aggregation capabilities. An example method generally includes signaling, to a base station (BS), carrier aggregation capability information indicating a capability for performing separate operations concurrently on a plurality of component carriers; receiving a carrier aggregation configuration indicating component carriers designated for the separate operations; and receiving or transmitting transmissions based on the carrier aggregation configuration.

38 Claims, 10 Drawing Sheets

(56) References Cited

U.S. PATENT DOCUMENTS

| | | | | |
|---|---|---|---|---|
| 2019/0166603 A1* | 5/2019 | Wang | ................... | H04B 7/0868 |
| 2020/0280337 A1* | 9/2020 | Yi | ....................... | H04B 1/7143 |
| 2021/0227409 A1* | 7/2021 | Siomina | .............. | H04B 7/0617 |
| 2021/0376985 A1* | 12/2021 | Zhou | .................... | H04L 5/0053 |

OTHER PUBLICATIONS

Qualcomm Incorporated: "Enhancements to Scheduling and HARQ for eURLLC", 3GPP TSG RAN WG1 #96bis, 3GPP Draft; R1-1905022 Enhancements to Scheduling and HARQ for EURLLC, 3rd Generation Partnership Project (3GPP), Mobile Competence Centre; 650 Route Des Lucioles; F-06921 Sophia-Antipolis Cedex, vol. RAN WG1, No. Xi 'an, China; Apr. 8, 2019-Apr. 12, 2019, Apr. 3, 2019 (Apr. 3, 2019), 6 Pages, XP051707364, Retrieved from the Internet: URL: http://www.3gpp.org/ftp/tsg%5Fran/WG1%5FRL1/TSGR1%5F96b/Docs/R1%2D1905022%2Ezip "[retrieved on Apr. 3, 2019] p. 4".

Qualcomm Incorporated: "Multi-TRP Enhancements", 3GPP TSG-RAN WG1 Meeting #96b, 3GPP Draft; R1-1905026 Multi-TRP Enhancements, 3rd Generation Partnership Project (3GPP), Mobile Competence Centre 650, Route Des Lucioles, F-06921 Sophia-Antipolis Cedex, France, vol. RAN WG1, No. XI 'an, China; Apr. 8, 2019-Apr. 12, 2019, Apr. 7, 2019 (Apr. 7, 2019), XP051700135, Apr. 8, 2019-Apr. 12, 2019, 36 Pages, Retrieved from the Internet: URL: http://www.3gpp.org/ftp/Meetings%5F3GPP%5FSYNC/RAN1/Docs/R1%2D1905026%2Ezip [retrieved "on Apr. 7, 2019] p. 5-p. 6".

* cited by examiner

CARRIER AGGREGATION CAPABILITY FRAMEWORK

CROSS-REFERENCE TO RELATED APPLICATION

The present Application for Patent claims priority to U.S. Provisional Application No. 62/836,572, filed Apr. 19, 2019, which is assigned to the assignee of the present application and hereby expressly incorporated by reference herein in its entirety.

BACKGROUND

Field of the Disclosure

Aspects of the present disclosure relate to wireless communications, and more particularly, to techniques for signaling processing capabilities on multiple component carriers, determining a carrier aggregation configuration based on the capability signaling, and determining when to drop certain traffic on a component carrier from a processing pipeline.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved carrier aggregation framework.

Certain aspects provide a method for wireless communication by a user equipment (UE). The method generally includes signaling, to a base station (BS), carrier aggregation capability information indicating a capability for performing separate operations concurrently on a plurality of component carriers; receiving a carrier aggregation configuration indicating component carriers designated for the separate operations; and receiving or transmitting transmissions based on the carrier aggregation configuration. The separate operations include at least one of communicating with a single transmission-reception point (TRP), communicating with multiple TRPs, processing in-order transmissions, processing out-of-order transmissions, or processing transmissions according to a priority level.

Certain aspects provide a method for wireless communication by base station. The method generally includes receiving, from a UE, carrier aggregation capability information indicating a capability for performing separate operations concurrently on a plurality of component carriers by the UE; determining a carrier aggregation configuration for the UE based on the carrier aggregation capability information; signaling, to the UE, the carrier aggregation configuration; and transmitting or receiving transmissions based at least in part on the carrier aggregation configuration. The separate operations include at least one of communicating with a single TRP, communicating with multiple TRPs, processing in-order transmissions, processing out-of-order transmissions, or processing transmissions according to a priority level.

Certain aspects provide a method for wireless communication by a user equipment. The method generally includes receiving a carrier aggregation configuration from a base station; obtaining a first transmission and a second transmission; determining to drop the first transmission from a processing pipeline based at least in part on the carrier aggregation configuration exceeding a processing capability of the UE; and processing the second transmission.

Certain aspects provide a method for wireless communication by base station. The method generally includes determining a carrier aggregation configuration for a UE; signaling, to the UE, the carrier aggregation configuration; signaling, to the UE, one or more rules for dropping a transmission in a processing pipeline when the carrier aggregation configuration exceeds a processing capability of the UE; and transmitting or receiving transmissions based at least in part on the carrier aggregation configuration.

Certain aspects provide an apparatus for wireless communication. The apparatus generally includes a transceiver configured to: transmit, to a base station (BS), carrier aggregation capability information indicating a capability for performing separate operations concurrently on a plurality of component carriers, receive a carrier aggregation configuration indicating component carriers designated for the separate operations, and receive or transmit transmissions based on the carrier aggregation configuration. The separate operations include at least one of communicating with a single TRP, communicating with multiple TRPs, processing in-order transmissions, processing out-of-order transmissions, or processing transmissions according to a priority level.

Certain aspects provide an apparatus for wireless communication. The apparatus generally includes a transceiver configured to receive, from a user equipment (UE), carrier aggregation capability information indicating a capability for performing separate operations concurrently on a plurality of component carriers by the UE. The apparatus further includes a processing system configured to determine a carrier aggregation configuration for the UE based on the carrier aggregation capability information. The transceiver is configured to transmit, to the UE, the carrier aggregation configuration and transmit or receive transmissions based at least in part on the carrier aggregation configuration. The separate operations include at least one of communicating with a single TRP, communicating with multiple TRPs, processing in-order transmissions, processing out-of-order transmissions, or processing transmissions according to a priority level.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure generally relate to a carrier aggregation framework. A user equipment may have limited processing resources to communicate with a plurality of component carriers while performing various operations concurrently on the component carriers. The user equipment may signal, to a wireless network entity, a capability for performing separate operations concurrently on the component carriers. Certain aspects of the present disclosure provide frameworks for indicating the carrier aggregation capabilities of the user equipment in various operating modes, such as communicating with a single transmission-reception point (TRP), communicating with multiple TRPs, processing transmissions in-order, processing transmissions out-of-order, and/or processing high priority transmissions.

Certain aspects of the present disclosure also provide techniques for processing transmissions via component carriers when the carrier aggregation configuration exceeds the processing capabilities of the user equipment. For instance, the user equipment may drop certain traffic from a processing pipeline to enable the processing of other traffic, such as high priority traffic.

Example Wireless Communication Network

Figure 1:
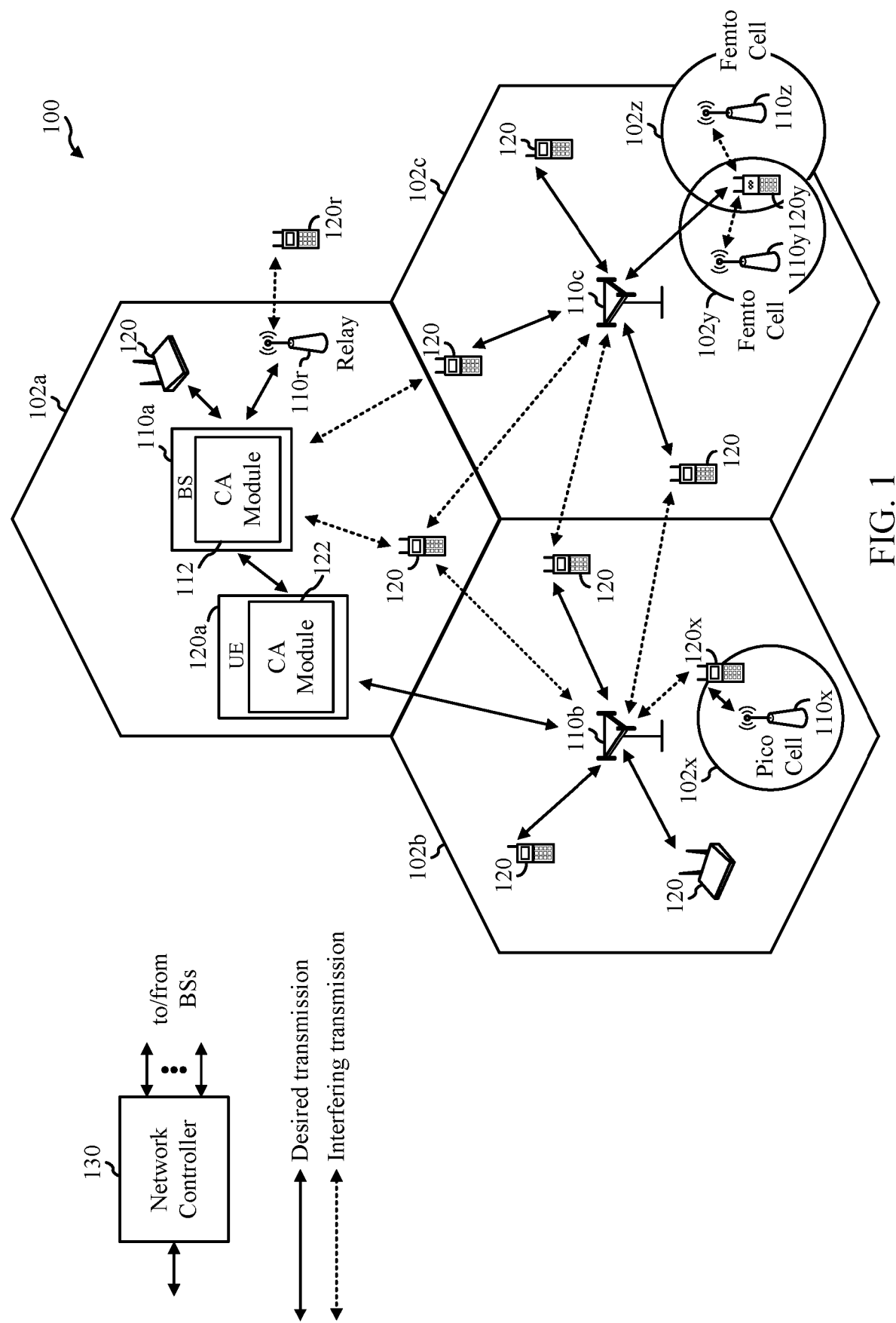
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be a 5G New Radio wireless communication network. For example, as shown in FIG. 1, the UE 120a has a carrier aggregation (CA) module 122 that may be configured for signaling a capability for performing separate operations concurrently on a plurality of component carriers and/or determining to drop certain component carrier traffic from a processing pipeline, according to aspects described herein. The BS 110a has a CA module 112 that may be configured for determining a carrier aggregation configuration for the UE and/or signaling one or more priority rules for dropping a transmission in a processing pipeline, according to aspects described herein.

NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110 and other network entities. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells. Wireless communication network 100 may also include relay stations. In the example shown in FIG. 1, a relay station 110r may communicate with the BS 110a and a UE 120r in order to facilitate communication between the BS 110a and the UE 120r. A relay station may also be referred to as a relay BS, a relay, etc.

The UEs 120 (e.g., 120x, 120y, etc.) may be dispersed throughout the wireless communication network 100, and each UE may be stationary or mobile. In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

Figure 2:
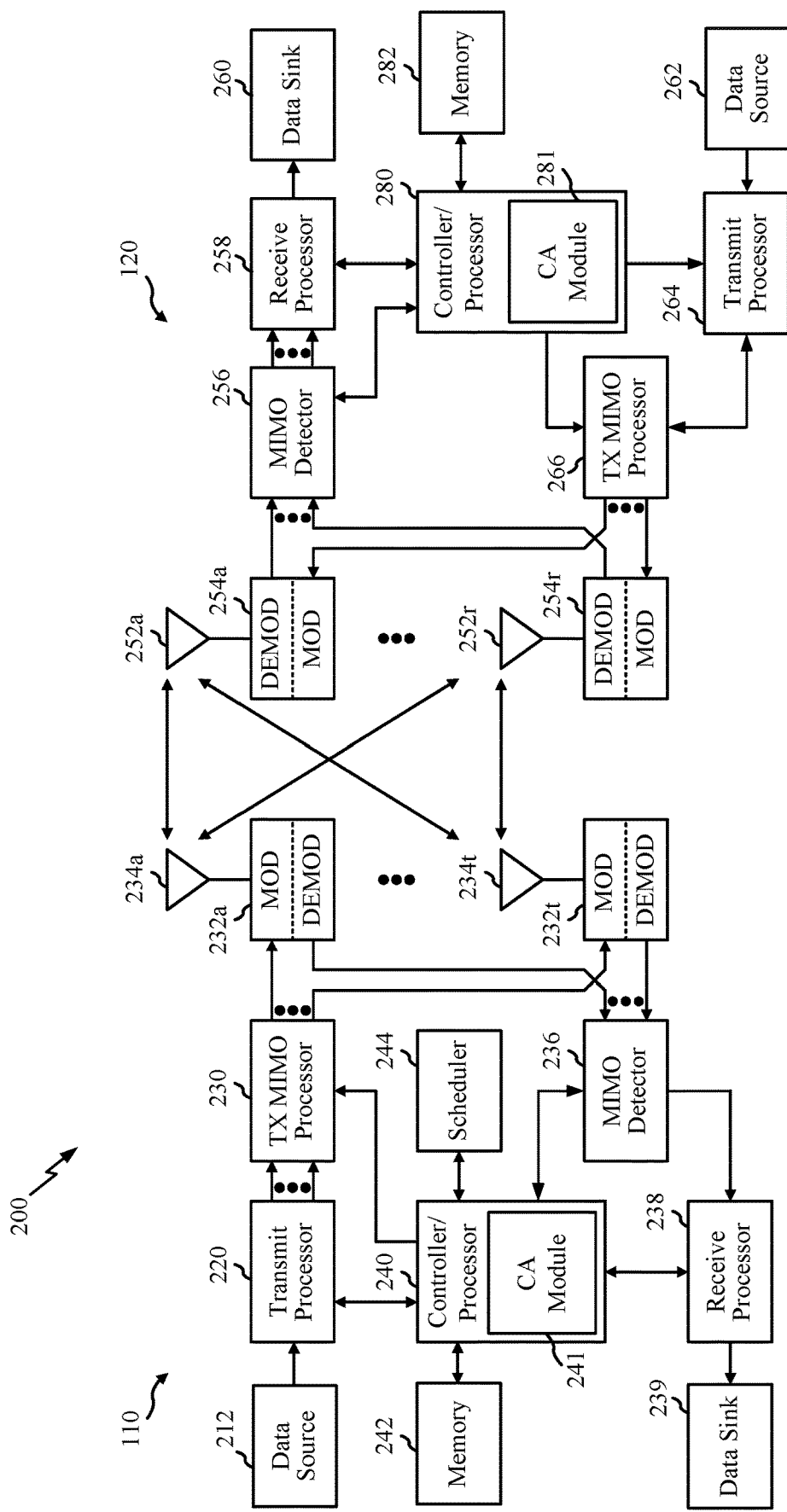
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 240 of the BS 110 has a CA module 241 that may be configured for determining a carrier aggregation configuration for the UE and/or signaling one or more priority rules for dropping a transmission in a processing pipeline, according to aspects described herein. For example, as shown in FIG. 2, the controller/processor 280 of the UE 120 has an CA module 281 that may be configured for performing separate operations concurrently on a plurality of component carriers and/or determining to drop certain component carrier traffic from a processing pipeline, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Carrier Aggregation Capability Framework

Certain wireless communication networks (e.g., a 5G NR wireless communication network) may support communications on multiple component carriers (CCs), which may be referred to as carrier aggregation. For instance, a user equipment may communicate with a base station via multiple CCs for the downlink and/or multiple CCs for the uplink.

Certain wireless communication networks may also support communication links to the UE via multiple transmission-reception points (TRPs) or multiple antenna panels operated by a single TRP. As used herein multi-TRP operations may include communications with multiple TRPs and/or multiple antenna panels operated by a single TRP. Under multi-TRP operations, the UE may receive multiple independently scheduled data streams from different TRPs (or panels) simultaneously. For example, the UE may decode multiple control signals (e.g., downlink control information (DCI)) from different TRPs simultaneously and multiple data streams (e.g., PDSCH) from different TRPs simultaneously.

When the UE is configured with multiple CCs in conjunction with multi-TRP operations, the complexity for the UE to process incoming and/or outgoing transmissions increases. For instance, the UE may be limited by the number of transmissions that the UE is capable of processing simultaneously. The number of transmissions that the UE is capable of processing may depend on the number of component carriers assigned to the UE and/or the number of TRPs communicating with the UE. In aspects, the processing complexity for incoming/outgoing transmissions may be affected by the number of control resource sets (CORESETs), the number of control channel elements (CCEs) or broadcast channels (BDs), or the number of HARQ processes assigned to the UE. For example, the number of CCEs that the UE is configured to decode may reduce the processing capacity of the UE to serve transmissions on more component carriers. In certain aspects, the processing complexity for incoming/outgoing transmissions may also be affected by the processing time designated to the UE to process the transmissions (e.g., Ni value).

The processing complexity for incoming/outgoing transmissions may also be affected by the UE performing out-of-order operations or in-order operations. For example, when the UE receives a high priority transmission (e.g., URLLC transmission), the UE may perform out-of-order operations to satisfy a latency requirement associated with the high priority transmission as further described herein.

Figure 3:
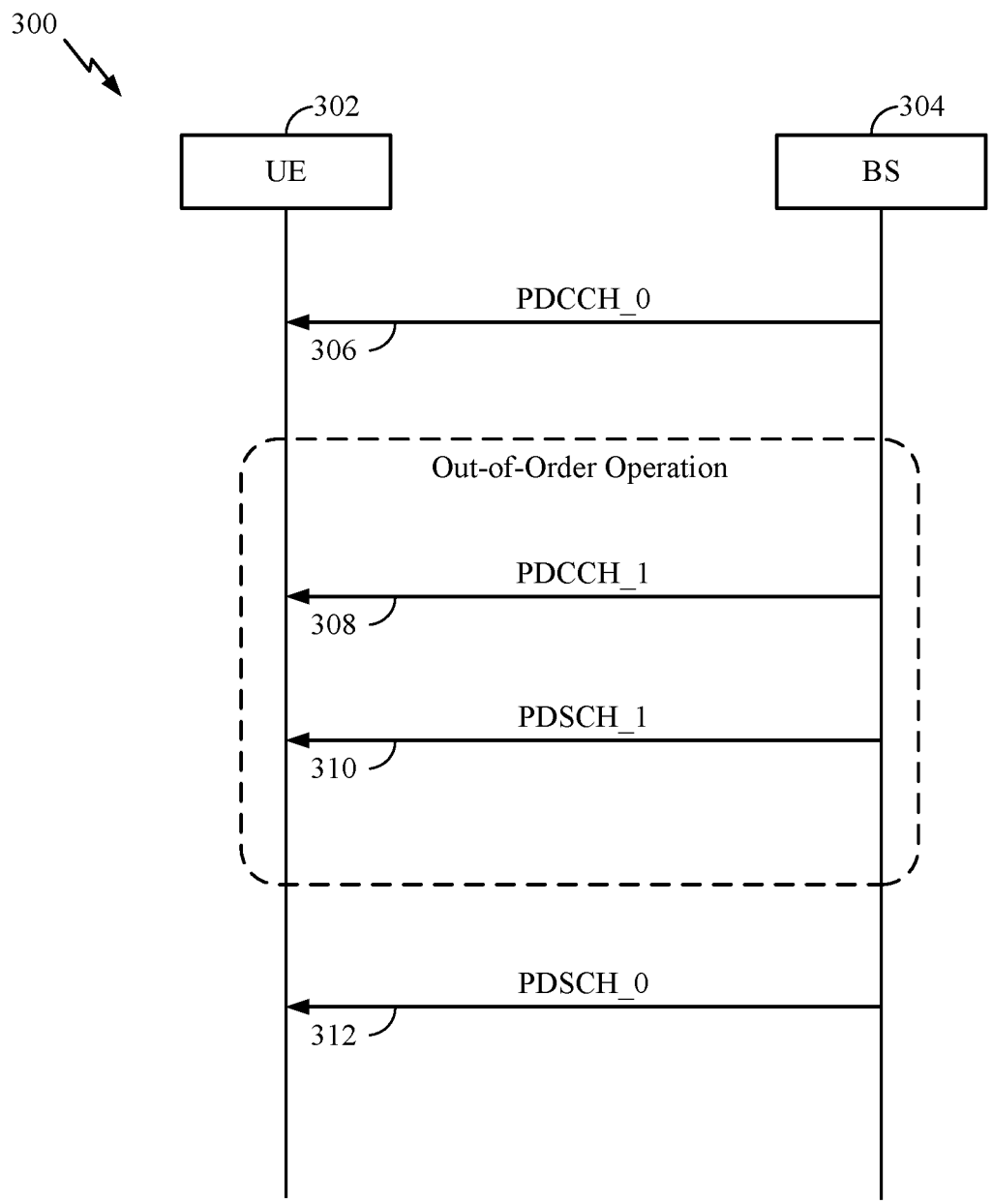
FIG. 3 is a call flow diagram illustrating example operations for performing out-of-order processing of a transmission.

FIG. 3 is a call flow diagram illustrating example operations 300 for performing out-of-order processing of a transmission, in accordance with certain aspects of the present disclosure. At 306, the UE 302 may receive a first PDCCH transmission (PDCCH_0) from the BS 304. The first PDCCH transmission may schedule the UE 302 to receive a first PDSCH transmission (PDSCH_0) ending at certain transmission time interval. At 308, the UE 302 may receive a second PDCCH transmission (PDCCH_1) that a schedules the UE 302 to receive a second PDSCH transmission (PDSCH_1) before the first PDSCH transmission. At 310, the UE 302 may receive the second PDSCH transmission before the first PDSCH transmission and proceed with processing the second PDSCH transmission (e.g., performing channel estimation, demodulation, and decoding). At 312, the UE 302 may receive the first PDSCH transmission. In certain aspects, processing out-of-order transmissions may include processing PDCCH-to-PDSCH transmissions, PDSCH-to-HARQ-Ack transmissions, or PDCCH-to-PUSCH transmissions out-of-order.

An in-order operation may be where the UE does not expect to receive or transmit a transmission before the end of a previously scheduled transmission. For example, the UE may receive the second PDSCH transmission depicted in FIG. 3 after receiving the first PDSCH transmission. An in-order operation may ensure the UE has enough processing resources to handle each outgoing/incoming transmission. Processing in-order transmissions may include processing PDCCH-to-PDSCH transmissions, PDSCH-to-HARQ-Ack transmissions, or PDCCH-to-PUSCH transmissions in-order.

In certain wireless communication networks (e.g., a 5G NR network), the UE may be assigned different priority levels for transmissions, including, for example URLLC, eMBB, and/or MTC (e.g., URLLC>eMBB>MTC). The UE may determine priority levels associated with the transmissions, respectively, based on various indications corresponding to the priority such as a downlink control information (DCI) format, a bit field in the DCI, a radio network temporary identifier (RNTI) of the DCI, a sounding reference signal resource indicator (SRI), a power control loop index indicated by the SRI, or the like. In certain aspects, URLLC services may take priority over eMBB services, thereby indicating out-of-order operations. The URLLC transmissions may have a higher priority level than eMBB transmissions.

Figure 5:
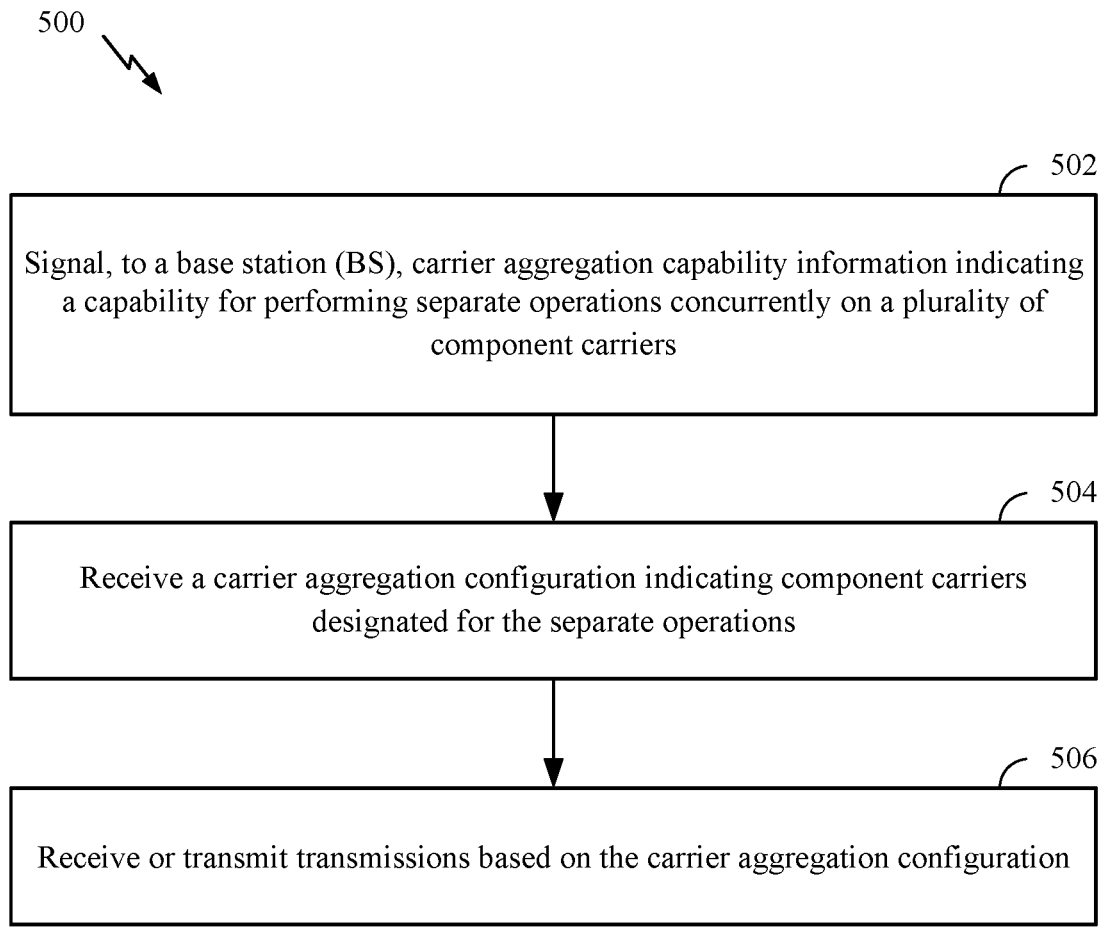
FIG. 5 is a flow diagram illustrating example operations for signaling carrier aggregation capability information to a network entity, in accordance with certain aspects of the present disclosure.
Figure 6:
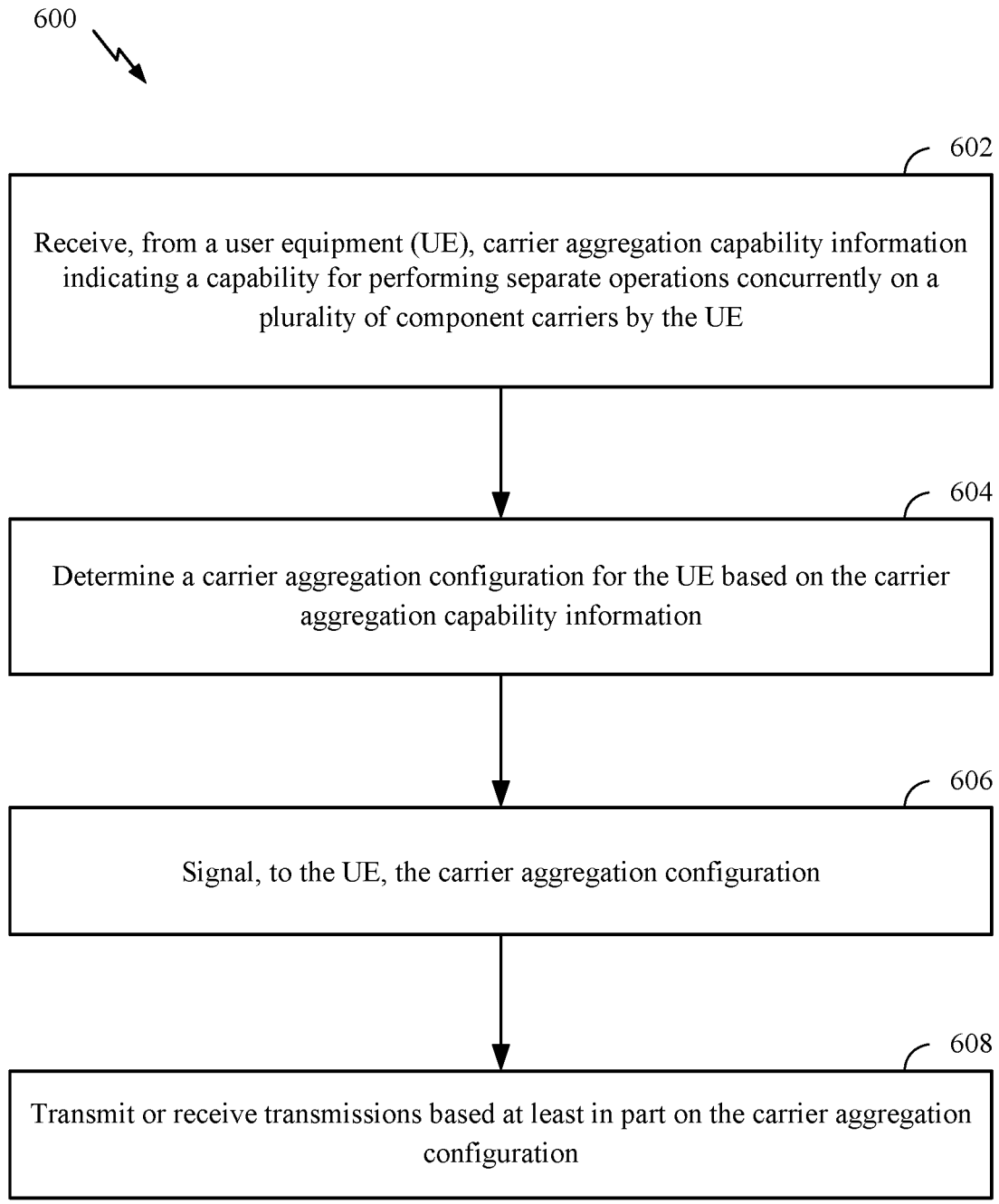
FIG. 6 is a flow diagram illustrating example operations for determining a carrier aggregation configuration, in accordance with certain aspects of the present disclosure.

Certain aspects of the present disclosure generally relate to a carrier aggregation framework that takes into account the separate operations assigned to the UE and processing capabilities of the UE under such operations, such as single TRP carrier aggregation, multi-TRP carrier aggregation, in-order operations, out-of-order operations, or high priority transmissions (e.g., URLLC transmissions), as further described herein with respect to FIGS. 5 and 6. For example, a UE may signal, to a BS, carrier aggregation capability information indicating a capability for performing separate operations (e.g., single TRP mode, multi-TRP mode, in-order mode, out-of-order mode, high priority traffic mode, and/or low priority traffic mode) concurrently on a plurality of component carriers. In certain aspects, the base station may determine a carrier aggregation configuration that complies with the capabilities signaled by the UE, and the UE may receive transmissions based on the carrier configuration.

As used herein, performing separate operations concurrently on a plurality of component carriers refers to executing various wireless communication operations at the same time via a plurality of component carriers. For example, a UE may perform separate operations concurrently by communicating with a single via a first set of one or more component carriers and, at the same time, communicating with multiple TRPs via a second set of one or more component carriers. In certain cases, the UE may perform separate operations concurrently by communicating with multiple TRPs via a first set of one or more component carriers and, at the same time, processing out-of-order transmissions via a second set of one or more component carriers.

In certain aspects, in single TRP mode, the UE may monitor the PDCCH(s) in one or more CORESETs in a group from a TRP. For example, CORESETs in the same group may be associated with a single TRP and a certain value for a CORESET pool index as indicated in a PDCCH configuration. The UE may monitor the PDCCH(s) in the CORESETs associated with the same value for the CORE-SET pool index. In multi-TRP mode, the UE may monitor the PDCCH(s) in CORESETs in multiple groups from one or more TRPs, where a CORESET group is associated with a different TRP and/or a different value for the CORESET pool index. In certain cases, each CORESET may be configured with a value of the CORESET pool index (e.g., a value of 0 or 1). That is, the CORESET pool index may group CORESETs into one or more groups, and in certain cases, one or two groups.

Certain aspects of the present disclosure also provide techniques for processing transmissions via component carriers when the carrier aggregation configuration does not satisfy (e.g., exceeds) the capabilities of the UE. For instance, the UE may have simultaneous traffic to process (e.g., received transmissions or outgoing transmissions), but lack the processing resources to adequately process all of the traffic simultaneously or within the processing time requirement (e.g., a latency requirement associated with URLLC). The UE may determine, based on various priority rules for example, to process one transmission while dropping another transmission from a processing pipeline as further described herein with respect to FIGS. 7 and 8.

Figure 4:
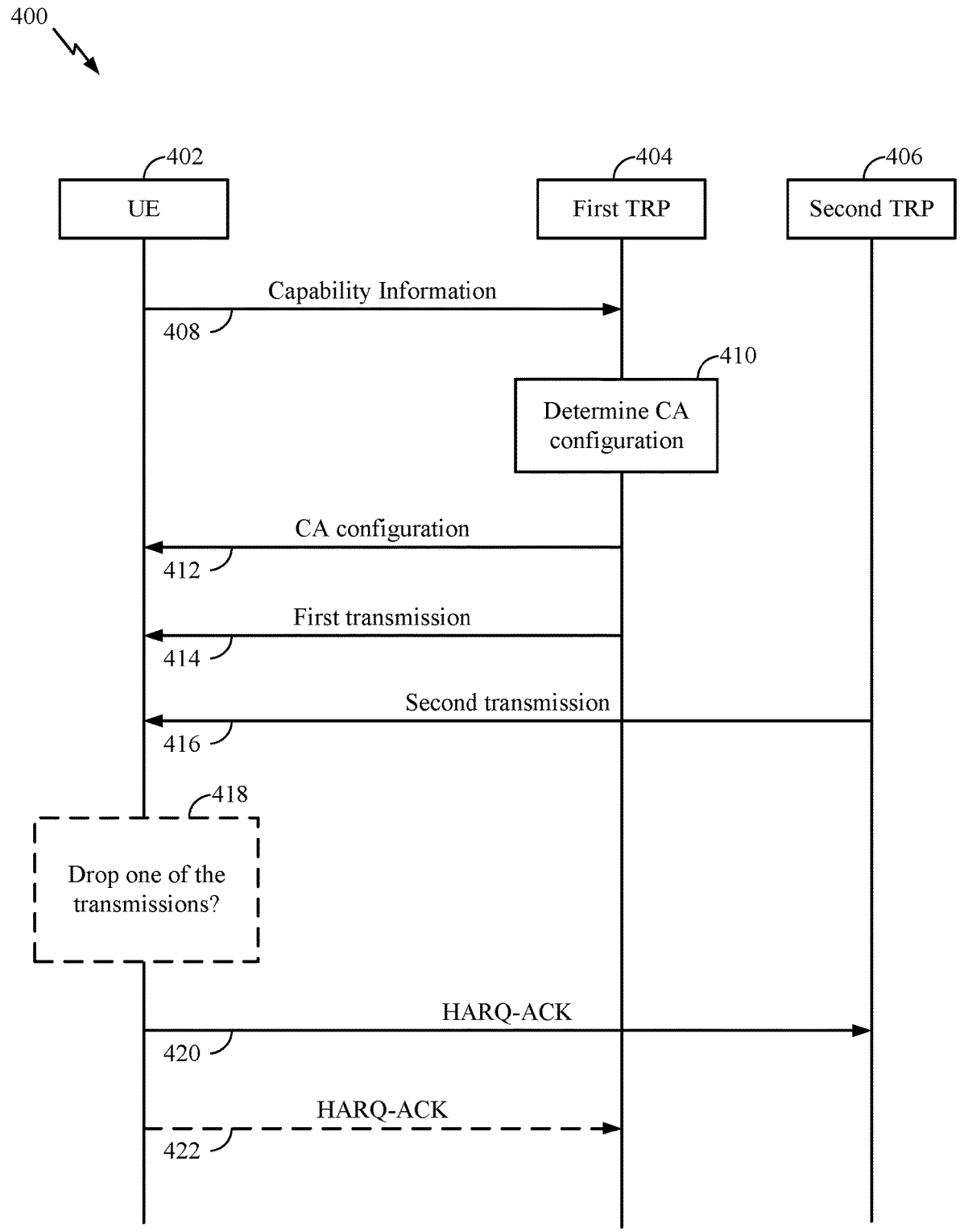
FIG. 4 is a call flow diagram illustrating example operations for implementing a carrier aggregation framework in a multi-transmission-reception point (multi-TRP) setting, in accordance with certain aspects of the present disclosure.

FIG. 4 is a call flow diagram illustrating example operations 400 for implementing a carrier aggregation framework in a multi-TRP setting, in accordance with certain aspects of the present disclosure. At 408, a UE 402 (e.g., UE 120a) may signal carrier aggregation capability information to a first TRP 404 (e.g., BS 110a). The carrier aggregation capability information may indicate a capability for performing separate operations (e.g., single TRP carrier aggregation, multi-TRP carrier aggregation, in-order operations, out-of-order operations, and/or processing high priority transmissions) concurrently on one or more component carriers. For example, the capability for performing separate operations may indicate a maximum number of component carriers designated for communicating with a single TRP and a maximum number of component carriers designated for communicating with multiple TRPs. In certain aspects, the UE may use other carrier aggregation frameworks for conveying the capability information as further described herein with respect to FIG. 5.

At 410, the first TRP 406 may determine a carrier aggregation configuration based on the capability information signaled by the UE 402 as further described herein with respect to FIG. 6. In certain aspects, the carrier aggregation configuration may not satisfy the carrier aggregation capabilities of the UE 402. That is, the carrier aggregation configuration may allow for simultaneous transmissions to the UE that exceed the processing capabilities of the UE, and the UE may determine which transmission(s) to drop from the processing pipeline (e.g., channel estimation, demodulation, decoding, preparing HARQ-ACK payload, preparing waveform, and transmitting HARQ-ACK) as further described herein with respect to FIGS. 7 and 8.

At 412, the UE 402 may receive the carrier aggregation configuration from the first TRP 404. For example, the carrier aggregation configuration may assign multiple component carriers to the first TRP 404 and multiple component carriers to the second TRP 406. The BS may signal the carrier aggregation configuration via control signaling such as DCI messages and/or radio resource control signaling.

In certain aspects, the UE 402 may be simultaneously communicating with multiple TRPs, such as the first TRP 404 and second TRP 406 (e.g., BS 120b), using multiple component carriers, and the transmissions from the TRPs may vary in priority levels (e.g., URLLC transmission or eMBB transmissions). At 414, the UE 402 may receive a first transmission from the first TRP 404, and at 416, the UE 402 may receive a second transmission from a second TRP 406.

In certain aspects, the second transmission may have a higher priority (e.g., a URLLC transmission) than the first transmission (e.g., eMBB transmission) indicating to the UE 402 to process the second transmission before the UE 402 is scheduled to process the first transmission, which may be referred to as an out-of-order operation. At 420, the UE may process the second transmission and send a HARQ message (e.g., a HARQ-ACK) to the second TRP 406. At 422, the UE may process the first transmission and send a HARQ-ACK to the first TRP 404 after the HARQ-ACK is sent to the second TRP 406.

In certain aspects, the UE 402 may lack the processing resources to process the second transmission within the latency requirements prescribed for the higher priority transmission and still adhere to the latency requirements prescribed for the first transmission to process the first transmission. At 418, the UE 402 may determine to process the second transmission and drop the first transmission from a processing pipeline, thereby freeing up processing resources for the higher priority second transmission. In aspects, the UE 402 may evaluate the processing resources and drop a transmission independent of the carrier aggregation capability framework as further described herein with respect to FIGS. 7 and 8.

Although the operations 400 are described and depicted as a multi-TRP setting, the first and second TRPs depicted in FIG. 4 may also be considered different component carriers from a single TRP or different antenna panels from a single TRP.

FIG. 5 is a flow diagram illustrating example operations 500 for signaling carrier aggregation capability information to a network entity (e.g., BS 110a), in accordance with certain aspects of the present disclosure. The operations 500 may be performed, for example, by UE (e.g., such as a UE 120a in the wireless communication network 100). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 502, by the UE signaling, to a base station (e.g., BS 110a), carrier aggregation capability information indicating a capability for performing separate operations concurrently on a plurality of component carriers. In aspects, the separate operations may include at least one of communicating with a single TRP, communicating with multiple TRPs, processing in-order transmissions, processing out-of-order transmissions, or processing transmissions according to a priority level (e.g., a high priority transmission may take precedence over a low priority transmission). At 504, the UE may receive a carrier aggregation configuration indicating component carriers designated for the separate operations. At 506, the UE may receive or transmit transmissions based on the carrier aggregation configuration.

FIG. 6 is a flow diagram illustrating example operations 600 for determining a carrier aggregation configuration based on the capabilities of a UE (e.g., UE 120*a*), in accordance with certain aspects of the present disclosure. The operations 600 may be performed, for example, by a BS (e.g., such as a BS 110*a* in the wireless communication network 100). The operations 600 may be complimentary operations by the BS to the operations 500 performed by the UE. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 602, by the BS receiving, from a UE (e.g., UE 120*a*), carrier aggregation capability information indicating a capability for performing separate operations concurrently on a plurality of component carriers by the UE. In aspects, the separate operations may include at least one of communicating with a single TRP, communicating with multiple TRPs, processing in-order transmissions, processing out-of-order transmissions, or processing transmissions according to a priority level. At 604, the BS may determine a carrier aggregation configuration for the UE based on the carrier aggregation capability information. At 606, the BS may signal, to the UE, the carrier aggregation configuration. At 608, the BS may transmit or receive transmissions based at least in part on the carrier aggregation configuration.

In certain aspects, the carrier aggregation capability information may be signaled by the UE and received by the BS via UE capability signaling, such as radio resource control (RRC) signaling. The UE may send UE capability information (e.g., a UECapabilitylnformation message) after receiving a UE capability enquiry from the network. The UE capability information may include the carrier aggregation capability information as described herein. The carrier aggregation capability information described herein may be indicated on a frequency band basis (e.g., a separate capability for each band) or more than one band (e.g., a general capability across more than one band).

In certain aspects, the carrier aggregation capability information at 502 and 602 may indicate a capability for performing multi-TRP operations (such as communicating with a single TRP or communicating with multiple TRPs). In aspects, communicating with a single TRP may include monitoring PDCCH(s) in a single CORESET group (e.g., a group of CORESETs associated with a certain value for a CORESET pool index), and communicating with multiple TRPs may include monitoring PDCCH(s) in multiple CORESET groups (e.g., groups of CORESETs associated with certain values for CORESET pool indexes). The capability for performing the separate operations as signaled at 502 or received at 602 may indicate a maximum number of component carriers designated for communication with a single TRP and a first complexity ratio ($\alpha_1$) for multi-TRP operations. The first complexity ratio ($\alpha_1$) may represent the complexity in processing multi-TRP communications relative to processing single TRP communications on one or more component carriers. For example, if the UE is capable of supporting a maximum of X component carriers in single-TRP mode, the UE may be capable of supporting $X/\alpha_1$ component carriers in multi-TRP mode. The first complexity ratio may have a value from 1 to 2 (e.g., $1 \leq \alpha_1 \leq 2$), implying the multi-TRP complexity may not be more than twice the single-TRP complexity and may not be less than the single-TRP complexity.

Determining the carrier aggregation configuration (e.g., at 604) may include determining that a sum of component carriers based on the first complexity ratio is less than or equal to the maximum number of component carriers designated for communication with the single TRP. For instance, the BS or UE may determine the component carrier configuration according to the following expression:

$$x + \alpha_1 \cdot y \leq X \quad (1)$$

where the BS configures the UE with x CCs for single-TRP and y CCs for multi-TRP, (X, $\alpha_1$) are indicated through capability signaling, and $\alpha_1 \cdot y$ translates the total multi-TRP complexity into the single-TRP complexity domain.

In certain aspects, the capability information signaled at 502 or received at 602 may indicate the maximum number of component carriers (X) designated for communicating with a single TRP and a maximum number of component carriers (Y) designated for communicating with multiple TRPs. The first complexity ratio may be derived from X/Y. The value of Y may have limited a range based on the value of X, such as $$\frac{X}{2} \leq Y \leq X.$$

In certain aspects, the capability for performing the separate operations may be indicated by a set of component carrier combinations, wherein each of the component carrier combinations includes a number of component carriers for each of the separate operations. Each of the component carrier combinations may include a first number of component carriers designated for a first operation and a second number of component carriers designated for a second operation. For example, the set of component carrier combinations may include a set of component carrier pairs, e.g., $\{(X_1, Y_1), (X_2, Y_2), \ldots, (X_m, Y_m)\}$, where each pair indicates the number of component carriers (e.g., $X_1$) that the UE is capable of supporting for single-TRP and at the same time the number of component carriers (e.g., K) that the UE can support for multi-TRP. A valid carrier aggregation configuration may be determined from the set of component carrier combination indicated by the UE. For instance, determining the carrier aggregation configuration (e.g., at 604) may include determining component carriers that satisfy at least one of the component carrier combinations.

In certain aspects, the carrier aggregation capability information at 502 and 602 may indicate a capability for processing out-of-order transmissions. For instance, the UE may be configured with component carriers that carry traffic at different priority levels such as URLLC traffic and eMBB traffic. When the UE receives a high priority transmission (e.g., URLLC transmission), for example, the UE may process the transmission out-of-order as described herein with respect to FIG. 3, in order to satisfy certain latency requirements associated with the high priority transmission. The carrier aggregation capability information may indicate a capability from which the maximum number of component carriers for each priority class may be determined.

In certain aspects, the capability information signaled at 502 or received at 602 may indicate a maximum number of component carriers designated for processing in-order operations and a second complexity ratio ($\alpha_2$). The second complexity ratio ($\alpha_2$) may represent the complexity in processing out-of-order transmissions relative to processing in-order transmissions on one or more component carriers. For example, if the UE is capable of supporting a maximum of X component carriers at in-order mode, the UE may be capable of supporting $X/\alpha_2$ component carriers in out-of-order mode. The second complexity ratio may have a value from 1 to 2 (e.g., $1 \leq \alpha_2 \leq 2$), implying the out-of-order complexity may not be more than twice the in-order complexity and may not be less than the in-order complexity.

Determining the carrier aggregation configuration (e.g., at 604) may include determining that a sum of component carriers based on the second complexity ratio is less than or equal to the maximum number of component carriers designated for processing in-order transmissions. For instance, the BS or UE may determine the component carrier configuration according to the following expression:

$$x + \alpha_2 \cdot y \leq X \quad (2)$$

where the BS configures the UE with x CCs for in-order mode and y CCs for out-of-order mode, (X, $\alpha_2$) are indicated through capability signaling, and $\alpha_2 \cdot y$ translates the total out-of-order complexity into the in-order complexity domain.

In certain aspects, the capability information signaled at 502 or received at 602 may indicate the maximum number of component carriers designated for processing in-order transmissions and a maximum number of component carriers (Y) designated for processing out-of-order transmissions. The second complexity ratio may be derived from X/Y. The value of Y may have a limited range based on the value of A, such as $$\frac{X}{2} \leq Y \leq X.$$

In certain aspects, the carrier aggregation capability information at 502 and 602 may indicate a capability for processing transmissions according to a priority level, such as high priority transmissions and/or low priority transmissions. For instance, the complexity of processing only high priority traffic on a component carrier may be greater than the complexity of processing only low priority traffic on a component carrier. The increased complexity may be due to a more stringent processing time requirement for the high priority traffic such as a latency requirement for URLLC. The capability for processing high priority transmissions may be indicated by a third complexity ratio ($\beta$). The third complexity ratio may represent the complexity for processing high priority traffic relative to processing lower priority traffic on one or more component carriers. The third complexity ratio may have a value greater than or equal to 1 ($\beta \geq 1$).

Determining the carrier aggregation configuration (e.g., at 604) may include determining that a sum of component carriers based on the second complexity ratio and third complexity ratio is less than or equal to the maximum number of component carriers (X) designated for processing in-order transmissions. For instance, the BS or UE may determine the component carrier configuration according to the following expression:

$$x_1 + \beta \cdot x_2 + \alpha_2 \cdot \beta \cdot y \leq X \quad (3)$$

where the BS configures the UE with $x_1$ component carriers for low priority in-order traffic, $x_2$ component carriers for high priority in-order traffic, and y component carriers for out-of-order mode (high and low priority traffic); (X, $\alpha_2$, $\beta$) may be indicated through UE capability signaling; $\beta \cdot x_2$ translates the high priority complexity into the low priority in-order complexity domain; and $\alpha_2 \cdot \beta \cdot y$ translates the out-of-order complexity into the low priority in-order complexity domain.

In certain aspects, the UE may indicate the maximum number of component carriers that can be configured for high priority traffic ($X_1$) and the maximum number of component carriers that can be configured for low priority traffic ($X_2$). The BS may configure the UE with $x_1$ component carrier for high priority traffic and $x_2$ component carriers for low priority traffic. The BS may determine that the configuration is valid if $x_1 \leq X_1$ and $x_2 \leq X_2$. In certain aspects, the component carrier combinations may include a set of component carrier pairs, e.g., $\{(X_{1,1}, X_{2,1}), (X_{1,2}, X_{2,2}), \ldots, (X_{1,m}, X_{2,m})\}$, where each pair indicates the number of component carriers (e.g., $X_{1,1}$) that the UE is capable of supporting for high priority traffic and at the same time the number of component carriers (e.g., $X_{2,1}$) that the UE is capable of supporting for low priority traffic. A carrier aggregation configuration having $x_1$ component carriers for high priority traffic and $x_2$ component carriers for low priory traffic may be valid only if there exists component carrier combination $(X_{1,i}, X_{2,i})$ in the set that satisfies $x_1 \leq X_{1,i}$ and $x_2 \leq X_{2,i}$.

In certain aspects, the carrier aggregation capability information at 502 and 602 may indicate a capability for performing a combination of the various operations described herein (e.g., single TRP mode, multi-TRP mode, in-order mode, out-of-order mode, high priority traffic mode, and/or low priority traffic mode). For example, the capability for performing the separate operations at 502 and 602 may be indicated by a maximum number of component carriers (X) designated for processing in-order transmission with a single TRP, the first complexity ratio ($\alpha_1$) for supporting communication with multiple TRPs relative to single TRP communications, the second complexity ratio ($\alpha_2$) for supporting out-of-order transmissions relative to in-order transmissions, and/or the third complexity ratio ($\beta$) for supporting high priority traffic relative to low priority traffic.

Determining the carrier aggregation configuration (e.g., at 604) may include determining that a sum of component carriers based on the first complexity ratio and second complexity ratio is less than or equal to the maximum number of component carriers designated for processing in-order transmissions with a single TRP. For instance, the BS or UE may determine the component carrier configuration according to the following expression:

$$x + \alpha_1 y_1 + \alpha_2 y_2 + \left(\frac{\alpha_1}{2} + \frac{\alpha_1 \alpha_2}{2}\right) y_3 + \alpha_1 \alpha_2 y_4 \leq X \quad (4)$$

where the UE is configured with x component carriers for single-TRP mode with one priority channel (eMBB or URLLC), $y_1$ component carriers for multi-TRP mode with one priority channel (eMBB or URLLC), $y_2$ component carriers for single-TRP mode with multiple priority channels (e.g., allowing for out-of-order transmissions across the two priority channels), $y_3$ component carriers for multi-TRP mode where one priority channel (eMBB or URLLC) is allowed from only one of the TRPs while multiple priorities are allowed from the other TRP (allowing for out-of-order across the priority channels for that TRP), and $y_4$ component carriers for multi-TRP mode with both priorities are allowed from both TRPs (allowing for out-of-order across the two priority channels for each TRP). In certain aspects, the third complexity ratio (β) may also be applied to determine a valid component carrier configuration.

In certain aspects, the carrier aggregation configuration signaled by the BS or received by the UE may exceed the processing capabilities of the UE. For instance, the UE may not be continuously scheduled by multiple TRPs or with out-of-order for high priority traffic (e.g., URLLC), especially with non-ideal backhaul. The network may configure the UE with component carriers that exceed the processing capabilities of the UE. Under such conditions, the UE may determine, based on various priority rules, to process some traffic while dropping other traffic from a processing pipeline (e.g., the processing pipeline for PDSCH-to-HARQ-Ack may include channel estimation, demodulation, decoding, preparing HARQ-ACK payload, preparing waveform, and transmitting HARQ-ACK). As an example, when multi-TRP or out-of-order scheduling is beyond the capability of the UE, the UE may keep the out-of-order operation on a given TRP by dropping the PDSCH/PUSCH transmission for another TRP. In another case, the UE may drop low priority traffic on a given TRP so as not to affect the high priority traffic on another TRP. The UE may drop transmissions on a certain TRP as further described herein with respect to FIG. 7. In aspects, the UE may receive, from the BS, one or more rules for dropping a transmission. The BS may signal, to the UE, one or more rules for dropping a transmission as further described herein with respect to FIG. 8.

Figure 7:
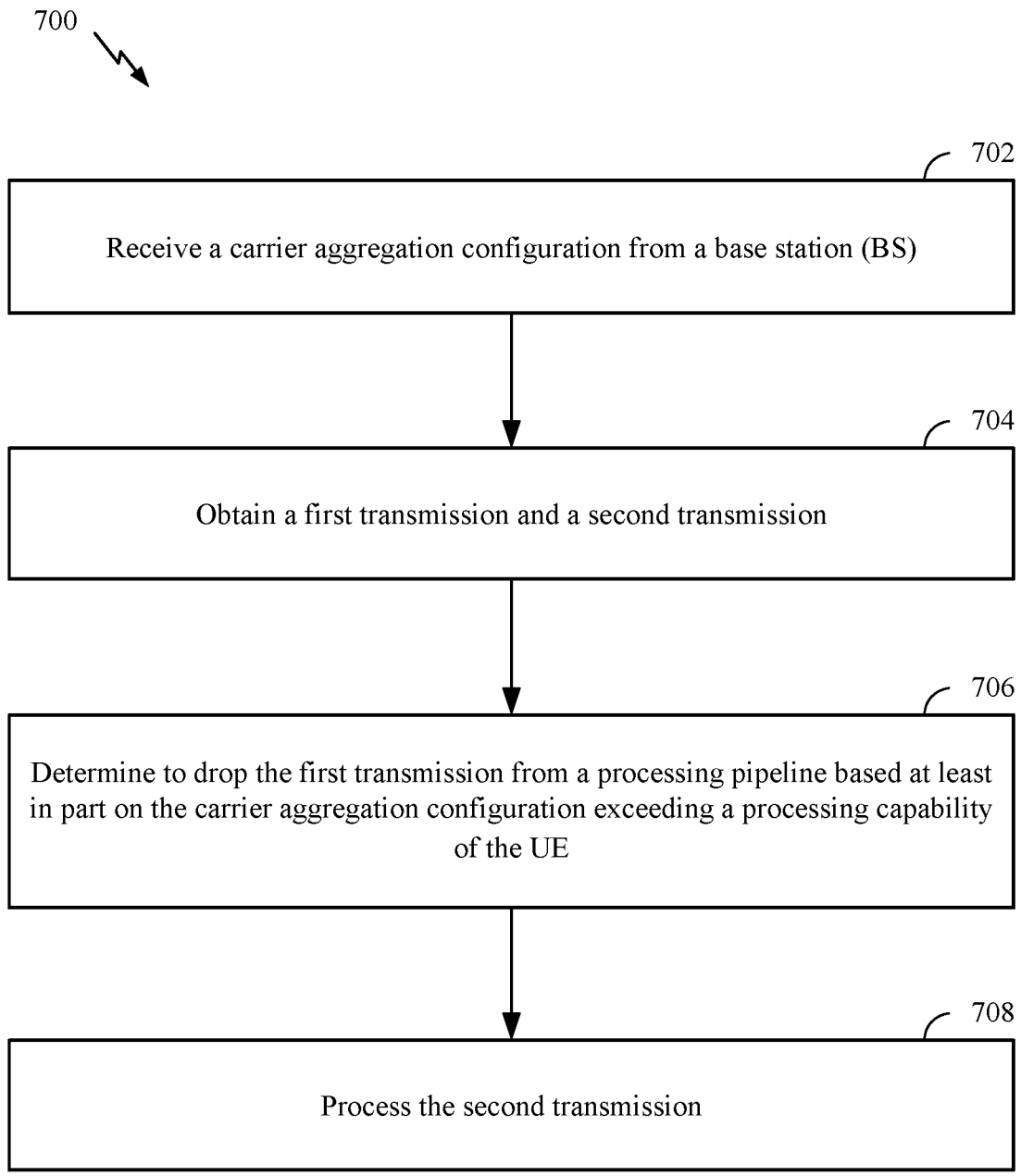
FIG. 7 is a flow diagram illustrating example operations for dropping a transmission from a processing pipeline, in accordance with certain aspects of the present disclosure.

FIG. 7 is a flow diagram illustrating example operations 700 for dropping a transmission from a processing pipeline, in accordance with certain aspects of the present disclosure. The operations 700 may be performed, for example, by a UE (e.g., such as a UE 120*a* in the wireless communication network 100).

The operations 700 may begin, at 702, by the UE may receive a carrier aggregation configuration from a base station (BS). At 704, the UE may obtain a first transmission for outgoing or incoming traffic and a second transmission for outgoing or incoming traffic. For instance, the UE may receive incoming traffic to process or generate outgoing traffic to process. At 706, the UE may determine to drop the first transmission from a processing pipeline based at least in part on the carrier aggregation configuration exceeding a processing capability of the UE. At 708, the UE may proceed with processing the second transmission the processing pipeline (e.g., error detection, error correcting, rate matching, interleaving and transport channel or control information mapping onto/splitting from physical channels) without processing the first transmission.

In certain aspects, the determining to drop the first transmission at 706 may be based at least in part on the second transmission having a higher priority than the first transmission as determined by one or more priority rules. For instance, the one or more priority rules of the operations 700 may include high priority traffic on a first TRP (or panel) taking priority over high priority traffic on a second TRP (or panel), the high priority traffic on the second TRP taking priority over low priority traffic on the first TRP, and low priority traffic on the first TRP taking priority over low priority traffic on the second TRP (e.g., high priority traffic on $TRP_0$>high priority traffic on $TRP_1$>low priority traffic on $TRP_0$>low priority traffic on $TRP_1$).

In aspects, the one or more priority rules of the operations 700 may include high priority traffic on a first TRP (or panel) taking priority over low priority traffic on the first TRP (or panel), the low priority on the first TRP taking priority over high priority traffic on a second TRP, and the high priority traffic on the second TRP taking priority over low priority traffic on the second TRP (e.g., high priority traffic on $TRP_0$>low priority traffic on $TRP_0$>high priority traffic on $TRP_1$>low priority traffic on $TRP_1$).

In certain aspects, the UE may receive, from the BS, the one or more rules for dropping a transmission. In other aspects, the UE may have pre-programmed rules for determining to drop a transmission from a processing pipeline.

In certain aspects, processing the second transmission at 708 may include processing the second transmission out of order relative to scheduling associated with the first transmission.

In certain aspects, the UE may be communicating with multiple TRPs. For instance, the first transmission may be from or to a first TRP, and the second transmission may be from or to a second TRP. In other aspects, the UE may be communicating with a single TRP, such that the first and second transmissions are from or to the same TRP.

In certain aspects, the UE may determine that the carrier aggregation configuration does not satisfy (e.g., exceeds) the carrier aggregation capability information signaled to the BS at 502 and perform operations 700 to ensure high priority traffic is processed.

Figure 8:
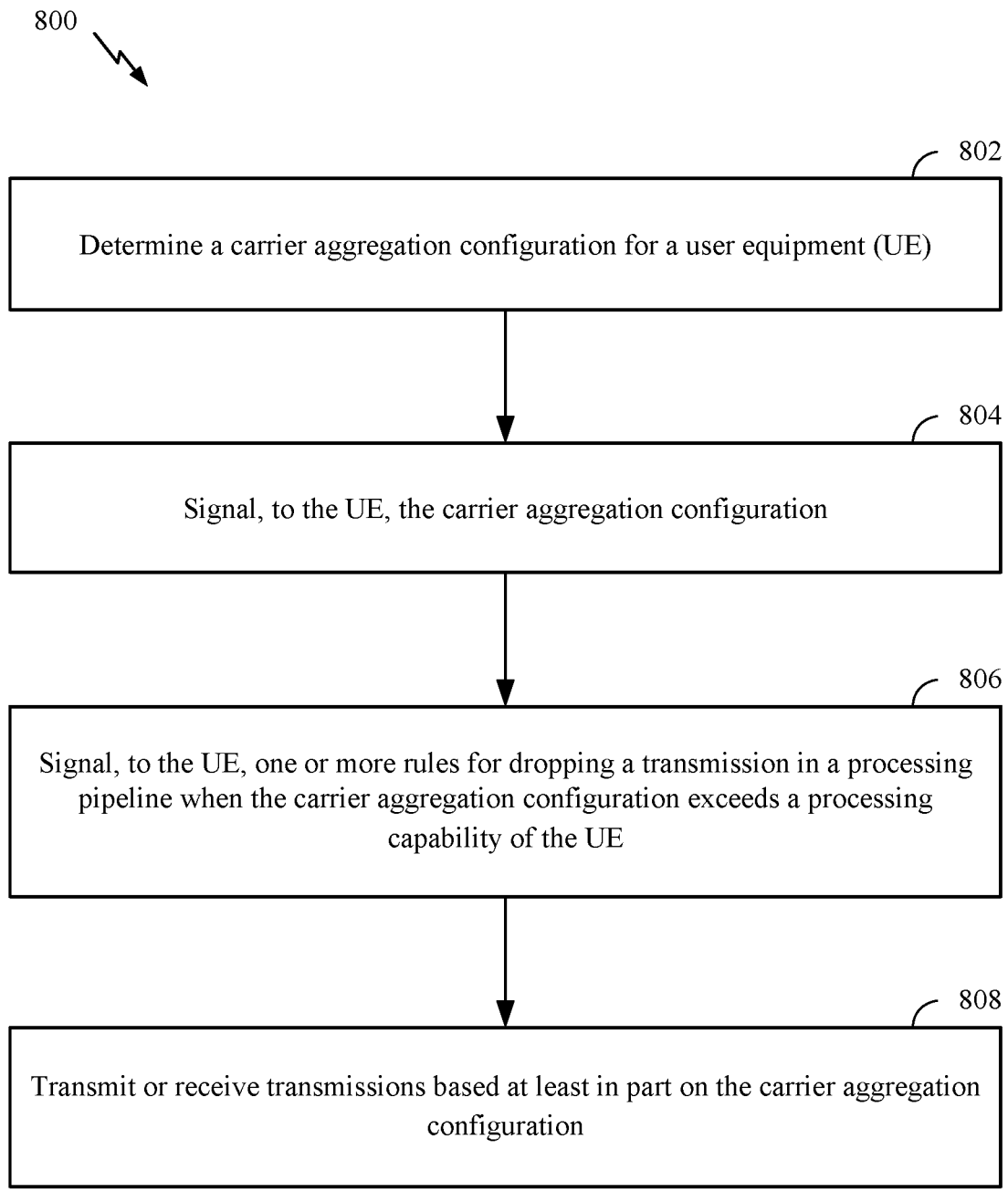
FIG. 8 is a flow diagram illustrating example operations for signaling one or more rules for dropping a transmission in a processing pipeline, in accordance with certain aspects of the present disclosure.

FIG. 8 is a flow diagram illustrating example operations 800 for signaling, to a UE (e.g., UE 120*a*), one or more rules for dropping a transmission in a processing pipeline, in accordance with certain aspects of the present disclosure. The operations 800 may be performed, for example, by a BS (e.g., such as a BS 110*a* in the wireless communication network 100).

The operations 800 may begin, at 802, by the BS determining a carrier aggregation configuration for a UE. At 804, the BS may signal, to the UE, the carrier aggregation configuration. At 806, the BS may signal, to the UE, one or more rules for dropping a transmission in a processing pipeline when the carrier aggregation configuration exceeds a processing capability of the UE. At 808, the BS may transmit or receive transmissions based at least in part on the carrier aggregation configuration. In aspects, the one or more rules for dropping a transmission may indicate which TRP takes priority over another TRP, for example, as described herein with respect to the operations 700.

Figure 9:
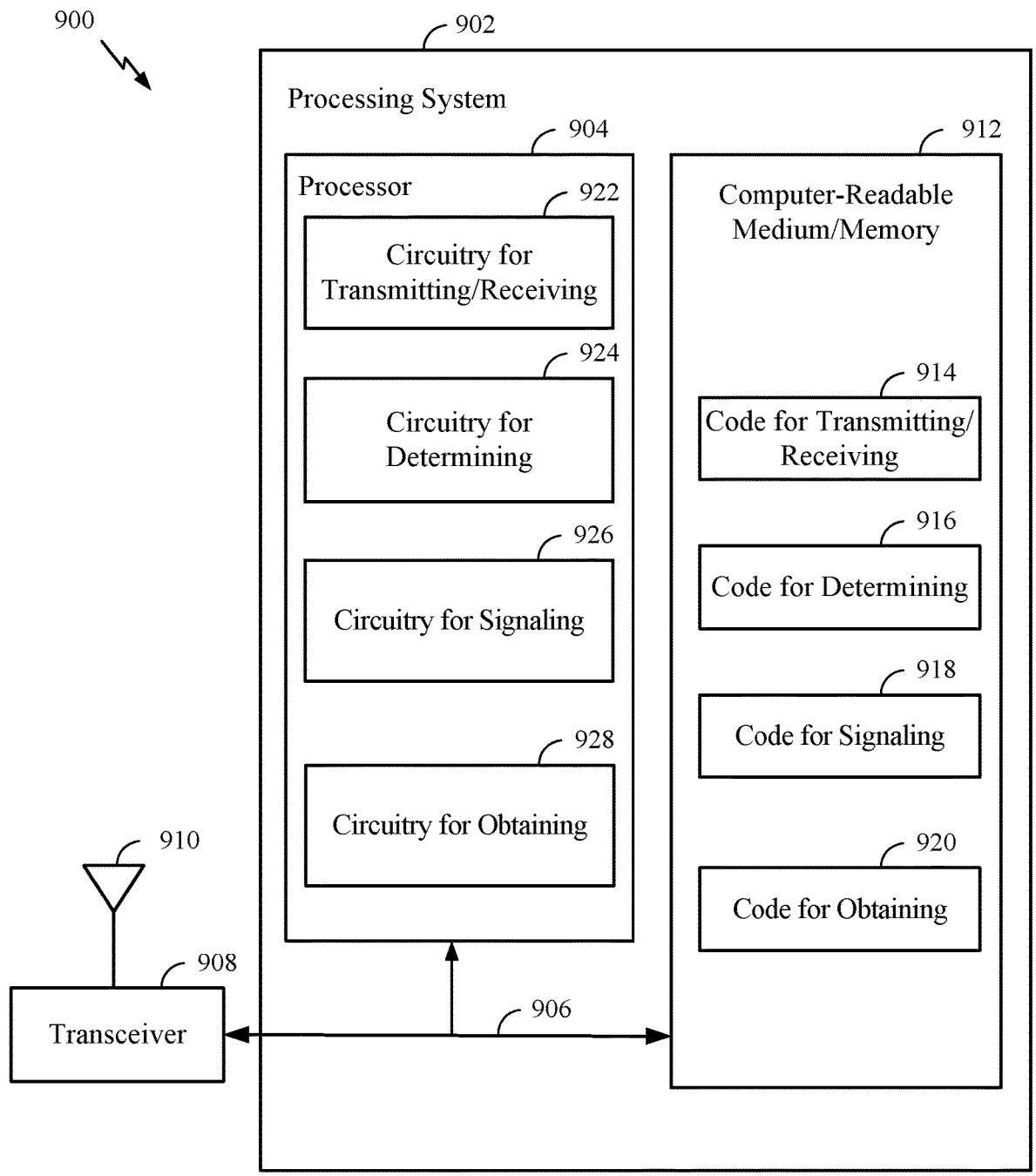
FIG. 9 illustrates a communications device (e.g., a UE) that may include various components configured to perform operations for the techniques disclosed herein in accordance with aspects of the present disclosure.

FIG. 9 illustrates a communications device 900 (e.g., UE 120) that may include various components (e.g., corresponding to means-plus-function components) configured to perform operations for the techniques disclosed herein, such as the operations illustrated in FIGS. 3-5 and 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 3-5 and 7, or other operations for performing the various techniques discussed herein. In certain aspects, computer-readable medium/memory 912 stores code for transmitting/receiving 914, code for determining 916, code for signaling 918, and/or code for obtaining 920. In certain aspects, the processor 904 has circuitry configured to implement the code stored in the computer-readable medium/memory 912. The processor 904 includes circuitry for transmitting/receiving 922, circuitry for determining 924, circuitry for signaling 926, and/or circuitry for obtaining 928.

Figure 10:
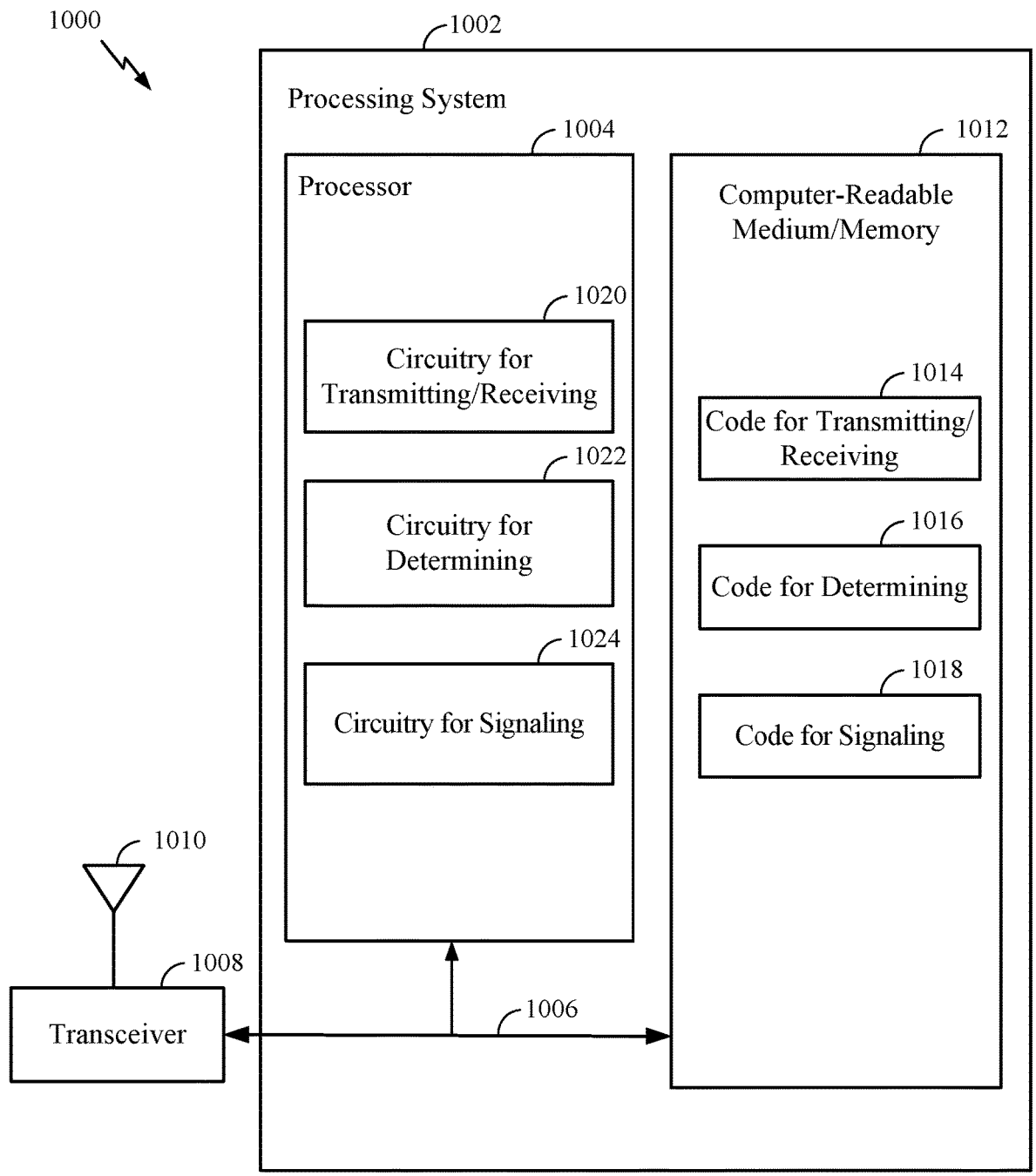
FIG. 10 illustrates a communications device (e.g., a BS) that may include various components configured to perform operations for the techniques disclosed herein in accordance with aspects of the present disclosure.

FIG. 10 illustrates a communications device 1000 (e.g., BS 110) that may include various components (e.g., corresponding to means-plus-function components) configured to perform operations for the techniques disclosed herein, such as the operations illustrated in FIGS. 3, 4, 6, and 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 3, 4, 6, and 8, or other operations for performing the various techniques discussed herein. In certain aspects, computer-readable medium/memory 1012 stores code for transmitting/receiving 1014, code for determining 1016, and/or code for signaling 1018. In certain aspects, the processor 1004 has circuitry configured to implement the code stored in the computer-readable medium/memory 1012. The processor 1004 includes circuitry for transmitting/receiving 1020, circuitry for determining 1022, and/or circuitry for signaling 1024.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

A BS may be a station that communicates with user equipment (UEs). Each BS may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes in a wireless communication network through various types of backhaul interfaces, such as a direct physical connection, a wireless connection, a virtual network, or the like using any suitable transport network.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS.

A BS for a pico cell may be referred to as a pico BS. A BS for a femto cell may be referred to as a femto BS or a home BS.

A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A wireless communication network may be a heterogeneous network that includes BSs of different types, e.g., macro BS, pico BS, femto BS, relays, etc. These different types of BSs may have different transmit power levels, different coverage areas, and different impact on interference in the wireless communication network. For example, macro BS may have a high transmit power level (e.g., 20 Watts) whereas pico BS, femto BS, and relays may have a lower transmit power level (e.g., 1 Watt).

A wireless communication network may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a transceiver configured to:
transmit, to a base station (BS), carrier aggregation capability information indicating a capability for performing separate operations concurrently on a plurality of component carriers, wherein the capability information include at least one of a first number of component carriers for communicating with a single transmission-reception point (TRP), or a second number of component carriers indicated by a first ratio for communicating with multiple TRPs, the capability information further include at least one of a third number of component carriers, indicated by a maximum number of component carriers designated for processing in-order transmissions, a fourth number of component carriers indicated by a second ratio or a maximum number of component carries designated for processing out-of-order transmissions, or a fifth number of component carriers for processing transmissions according to a priority level,
receive a carrier aggregation configuration indicating component carriers designated for the separate operations, and
receive or transmit transmissions based on the carrier aggregation configuration.

2. The apparatus of claim 1, wherein:
the first number of component carriers is indicated by a maximum number of component carriers designated for communication with the single TRP; and
the second number of component carriers is indicated by the first ratio of the maximum number of component carriers designed for communication with the single TRP.

3. The apparatus of claim 1, wherein:
the fourth number of component carriers is indicated by the second ratio of component
carriers designated for processing in-order transmissions.

4. The apparatus of claim 1, wherein the fifth number of component carriers is indicated by a third ratio of the number of component carries designed for processing out-of-order transmissions.

5. The apparatus of claim 1, wherein the capability for performing the separate operations is indicated by a set of component carrier combinations, wherein each of the component carrier combinations includes a number of component carriers for each of the separate operations.

6. The apparatus of claim 5, wherein each of the component carrier combinations includes a first number of component carriers designated for a first operation and a second number of component carriers designated for a second operation.

7. The apparatus of claim 5, wherein a first number of component carriers is designated for communication with the single TRP, and a second number of component carriers is designated for communication with multiple TRPs.

8. The apparatus of claim 1, wherein the carrier aggregation configuration exceeds the carrier aggregation capability information signaled to the BS.

9. The apparatus of claim 8, further comprising a processing system configured to determine to drop a first transmission and process a second transmission out of order, if the carrier aggregation configuration exceeds the carrier aggregation capability information signaled to the BS.

10. The apparatus of claim 9, wherein the first transmission is from or to a first TRP and the second transmission is from or to a second TRP.

11. The apparatus of claim 9, wherein the second transmission has a higher priority than the first transmission.

12. The apparatus of claim 9, wherein the first and second transmissions are from or to a same TRP.

13. The apparatus of claim 9, wherein the transceiver is configured to receive, from the BS, one or more rules for dropping a transmission, wherein determining to drop the first transmission is based at least in part on the one or more rules.

14. An apparatus for wireless communication, comprising:
a transceiver configured to receive, from a user equipment (UE), carrier aggregation capability information indicating a capability for performing separate operations concurrently on a plurality of component carriers by the UE, wherein the capability information include at least one of a first number of component carriers for communicating with a single transmission-reception point (TRP), or a second number of component carriers indicated by a first ratio for communicating with multiple TRPs, the capability information further include at least one of a third number of component carriers indicated by a maximum number of component carries designated for processing in-order transmissions, a fourth number of component carriers indicated by a second ratio or a maximum number of component carries designated for processing out-of-order transmissions, or a fifth number of component carriers for processing transmissions according to a priority level; and
a processing system configured to determine a carrier aggregation configuration for the UE based on the carrier aggregation capability information;
wherein the transceiver is configured to transmit, to the UE, the carrier aggregation configuration and transmit or receive transmissions based at least in part on the carrier aggregation configuration.

15. The apparatus of claim 14, wherein:
the first number of component carriers is indicated by a maximum number of component carriers designated for communication with the single TRP;
the second number of component carriers is indicated by the first ratio of the maximum number of component carriers designed for communication with the single TRP; and
the processing system is configured to determine that a sum of component carriers based on the first ratio is less than or equal to the maximum number of component carriers designated for communication with the single TRP.

16. The apparatus of claim 14, wherein:
the fourth number of component carriers is indicated by the second ratio of a maximum number of component carriers designated for processing in-order transmissions.

17. The apparatus of claim 16, wherein the processing system is configured to determine that a sum of component carriers based on the second ratio is less than or equal to the maximum number of component carriers designated for processing in-order transmissions.

18. The apparatus of claim 16, where the processing system is configured to identify that a total of component carriers for processing in-order transmissions is less than or equal to the maximum number of component carriers designated for processing in-order transmissions and a total of component carriers for out-of-order transmissions is less than or equal to the maximum number of component carriers designated for processing out-of-order transmissions.

19. The apparatus of claim 16, wherein:
the fifth number of component carriers is indicated by a third ratio of the number of component carriers designed for processing out-of-order transmissions;
the processing system is configured to determine that a sum of component carriers based on the second ratio and the third ratio is less than or equal to the maximum number of component carriers designated for processing in-order transmissions.

20. The apparatus of claim 14, wherein:
the capability for performing the separate operations is indicated by a set of component carrier combinations, wherein each of the component carrier combinations includes a number of component carriers for each of the separate operations; and
the processing system is configured to determine component carriers that satisfy at least one of the component carrier combinations.

21. The apparatus of claim 20, wherein each of the component carrier combinations includes a first number of component carriers designated for a first operation and a second number of component carriers designated for a second operation.

22. The apparatus of claim 21, wherein the first number of component carriers is designated for communication with a single TRP, and the second number of component carriers is designated for communication with multiple TRPs.

23. The apparatus of claim 14, wherein:
the capability for performing the separate operations is indicated by a maximum number of component carriers designated for communication with a single TRP, a first ratio of the maximum number of component carriers designated for communicating with the single TRP for supporting communication with multiple TRPs versus a single TRP, and a second ratio of the maximum number of component carriers designated for processing in-order transmissions for supporting out-of-order transmissions; and
the processing system is configured to determine that a sum of component carriers based on the first ratio and the second ratio is less than the maximum number of component carriers.

24. The apparatus of claim 14, wherein the carrier aggregation configuration exceeds the carrier aggregation capability information received by the BS.

25. The apparatus of claim 24, wherein the transceiver is configured to signal, to the UE, one or more rules for dropping a transmission in a processing pipeline when the carrier aggregation configuration exceeds a processing capability of the UE.

26. A method of wireless communication by a user equipment (UE), comprising:
signaling, to a base station (BS), carrier aggregation capability information indicating a capability for performing separate operations concurrently on a plurality of component carriers, wherein the capability information include at least one of a first number of component carriers for communicating with a single transmission-reception point (TRP), or a second number of component carriers indicated by a first ratio for communicating with multiple TRPs, the capability information further include at least one of a third number of component carries indicated by a maximum number of component carries designated for processing in-order transmissions, a fourth number of component carriers indicated by a second ratio or a maximum number of component carries designated for processing out-of-order transmissions, or a fifth number of component carriers for processing transmissions according to a priority level;

receiving a carrier aggregation configuration indicating component carriers designated for the separate operations; and receiving or transmitting transmissions based on the carrier aggregation configuration.

27. The method of claim 26, wherein:
the first number of component carriers is indicated by a maximum number of component carriers designated for communication with a single TRP;
the second number of component carriers is indicated by the first ratio of the maximum number of component carriers designated for communication with the single TRP;
the third number of component carriers is indicated by a maximum number of component carriers designated for processing in-order transmissions;
the fourth number of component carriers is indicated by the second ratio of the maximum number of component carriers designed for processing in-order transmissions or a maximum number of component carriers designated for processing out-of-order transmissions; and
the fifth number of component carriers is indicated by a third ratio of the number of component carriers designed for processing out-of-order transmissions.

28. The method of claim 26, wherein the capability for performing the separate operations is indicated by a set of component carrier combinations, wherein each of the component carrier combinations includes a number of component carriers for each of the separate operations.

29. The method of claim 26, wherein the capability for performing the separate operations is indicated by a maximum number of component carriers designated for communication with the single TRP, the first ratio for supporting communication with multiple TRPs versus single TRP, and the second ratio for supporting out-of-order transmissions.

30. The apparatus of claim 26, wherein the carrier aggregation configuration exceeds the carrier aggregation capability information signaled to the BS.

31. The method of claim 30, further comprising a processing system configured to determine to drop a first transmission and process a second transmission out of order, if the carrier aggregation configuration exceeds the carrier aggregation capability information signaled to the BS.

32. The method of claim 31, wherein the transceiver is configured to receive, from the BS, one or more rules for dropping a transmission, wherein determining to drop the first transmission is based at least in part on the one or more rules.

33. A method of wireless communication by a base station (BS), comprising:
receiving, from a user equipment (UE), carrier aggregation capability information indicating a capability for performing separate operations concurrently on a plurality of component carriers by the UE, wherein the capability information include at least one of a first number of component carriers for communicating with a single transmission-reception point (TRP), or a second number of component carriers indicated by a first ratio for communicating with multiple TRPs, the capability information further include at least one of a third number of component carriers indicated by a maximum number component carries designated for processing in-order transmissions, a fourth number of component carriers indicated by a second ratio or a maximum number of component carriers designated for processing out-of-order transmissions, or a fifth number of component carriers for processing transmissions according to a priority level;

determining a carrier aggregation configuration for the UE based on the carrier aggregation capability information;

signaling, to the UE, the carrier aggregation configuration; and transmitting or receiving transmissions based at least in part on the carrier aggregation configuration.

34. The method of claim 33, wherein:
the first number of component carriers is indicated by a maximum number of component carriers designated for communication with a single TRP;
the second number of component carriers is indicated by the first ratio of the maximum number of component carriers designated for communication with the single TRP;
the third number of component carriers is indicated by a maximum number of component carriers designated for processing in-order transmissions;
the fourth number of component carriers is indicated by the second ratio of the maximum number of component carriers designated for processing in-order transmissions or a maximum number of component carriers designated for processing out-of-order transmissions; and
the fifth number of component carriers is indicated by a third ratio of the number of component carriers designed for processing out-of-order transmissions.

35. The method of claim 34, wherein the processing system is configured to:
determine that a sum of component carriers based on the first ratio is less than or equal to the maximum number of component carriers designated for communication with the single TRP,
determine that a sum of component carriers based on the second ratio is less than or equal to the maximum number of component carriers designated for processing in-order transmissions,
identify that a total of component carriers for processing in-order transmissions is less than or equal to the maximum number of component carriers designated for processing in-order transmissions and a total of component carriers for out-of-order transmissions is less than or equal to the maximum number of component carriers designated for processing out-of-order transmissions, or
determine that a sum of component carriers based on the second ratio and the third ratio is less than or equal to the maximum number of component carriers designated for processing in-order transmissions.

36. The method of claim 33, wherein:
the capability for performing the separate operations is indicated by a set of component carrier combinations, wherein each of the component carrier combinations includes a number of component carriers for each of the separate operations; and
a processing system configured to determine component carriers that satisfy at least one of the component carrier combinations.

37. The method of claim 33, wherein:
the capability for performing the separate operations is indicated by a maximum number of component carriers designated for communication with the single TRP, the first ratio for supporting communication with multiple TRPs versus a single TRP, and the second ratio for supporting out-of-order transmissions; and
the processing system is configured to determine that a sum of component carriers based on the first ratio and the second ratio is less than the maximum number of component carriers.

38. The method of claim 33, wherein the carrier aggregation configuration exceeds the carrier aggregation capability information received by the BS.

* * * * *